United States Patent [19]

Beavers et al.

[11] Patent Number: 5,530,822
[45] Date of Patent: Jun. 25, 1996

[54] ADDRESS TRANSLATOR AND METHOD OF OPERATION

[75] Inventors: Brad Beavers; Lew Chua-Eoan; Chih-Jui Peng, all of Austin, Tex.

[73] Assignee: Motorola, Inc., Schaumburg, Ill.

[21] Appl. No.: 223,067

[22] Filed: Apr. 4, 1994

[51] Int. Cl.$^6$ .......................... G06F 12/10; G11C 15/00
[52] U.S. Cl. .............................................. 395/417; 365/49
[58] Field of Search .................... 395/421.02, 421.11, 395/401, 445, 460, 415, 417; 365/49

[56] References Cited

U.S. PATENT DOCUMENTS

| | | | |
|---|---|---|---|
| 3,764,996 | 10/1973 | Ross | 395/417 |
| 4,654,777 | 3/1987 | Nakamura | 395/416 |
| 4,903,234 | 2/1990 | Sakuraba et al. | 365/49 |
| 4,972,338 | 11/1990 | Crawford et al. | 395/416 |
| 5,107,417 | 4/1992 | Yokoyama | 395/416 |
| 5,133,058 | 7/1992 | Jensen | 395/417 |
| 5,155,825 | 10/1992 | Moughanni et al. | 395/417 |
| 5,263,140 | 11/1993 | Riordan | 395/417 |
| 5,327,372 | 7/1994 | Oka et al. | 365/49 |
| 5,375,214 | 12/1994 | Mirza et al. | 395/417 |

OTHER PUBLICATIONS

Furht et al. "A Survey of Microprocessor Architectures for Memory Management," IEEE Computer, 1987, pp. 48–67.
Baliga Designing with the Virtual Memory 80386, Intel Corporation, pp. 1–5.

Primary Examiner—Jack A. Lane
Attorney, Agent, or Firm—Lee E. Chastain

[57] ABSTRACT

An address translator (126) translates addresses, acting like a register file or a table, as necessary. The address translator contains a number of entries for matching an input address to a stored tag. An entry outputs a stored translated address if its stored tag matches the input address. A decoder (138) selects a particular entry in which to store an input translated address when the address translator operates as a register file. In these cases, a register number is also stored in the particular entry's as the entry's tag. Later, when it is necessary to read the particular entry, the register number is compared to each entry's tag to find a match. The disclosed address translator is compatible with both hardware and software refill algorithms ("tablewalks") without impacting its critical read speed path.

10 Claims, 7 Drawing Sheets

ADDRESS TRANSLATOR AND METHOD OF OPERATION

The present patent application is a member of the following group of pending patent applications related to one another by subject matter: "Address Translator and Method of Operation," to Beavers et al., Ser. No. 08/223,266, "address Translator with By-Pass Circuit and Method of Operation," to Peng, Ser. No. 08/222,783, "Address Translation Circuit," to Peng et al., Ser. No. 08/222,779, and "Address Translator and Method of Operation," to Beavers et al., Ser. No. 08/223,067, all filed concurrently herewith.

FIELD OF THE INVENTION

The present invention generally relates to digital computing systems, and more specifically to address translation methods and devices.

BACKGROUND OF THE INVENTION

Modern data processing systems typically incorporate address translation schemes. Address translation is a process of mapping the memory address manipulated by the system's data processor into an address presented to the system's memory system. Typically, the address manipulated by the data processing system's data processor is referred to as an "effective" or a "logical" address. Conversely, the address presented the data processing system's communications bus is referred to as a "real" or a "physical" address.

Address translation schemes improve the performance of a data processing system for at least three reasons. First, address translation schemes may be used to define certain useful characteristics about particular sections of main memory. For instance, these characteristics may prevent the system's data processor from writing to input/output devices during certain modes of operation or may restrict other regions of memory from being cached in the data processor's memory cache. Also, multiple software applications can be resident in the data processor's memory at the same time without fear of one program corrupting another program. Second, address translation schemes allow the data processor to execute programs that are larger than the system's random access memory ("RAM"). The majority of these very large programs are stored in permanent memory devices (hard disk drives, magnetic tape drives, etc.). Smaller portions of these very large programs are recalled into the system's RAM as needed. This feature is known as "virtual memory." Third, more than one data processor in a multi-processor data processing system ("MP") can easily access the same data stored in memory. Each data processor in an MP system can use a different address to access the same location in memory. This feature simplifies software programming of such a system. This feature may also be used by multiple programs executing in a single data processor data processing system.

There are three basic types of address translation schemes: paging, segmentation, and combined paging/segmentation. These three schemes each have advantages and disadvantages with respect to each other known in the art.

In a paging addressing scheme, the main memory is divided into a number of fixed-size blocks ("pages"). A certain number of address bits (most significant bits) of each effective address generated by the data processor identify a selected page in memory. The remaining number of address bits of each effective address (least significant bits) identify a byte within the selected page. Pages are often relatively small. Therefore, page translation data is voluminous and is stored in a table.

In a segmentation addressing scheme, the main memory is divided into a number of variable-size blocks ("segments"). The most and least significant bits of each effective address generated by the data processor identify a segment and a byte within the selected segment, respectively. Originally, a data processing system's operating system program code, its application program code, its application program data, and its pointer stack were each mapped to a different one of four segments in main memory. Consequently, the size of a segment has developed to be several orders of magnitude larger than the size of a page. Segment translation data is smaller and therefore may be stored in either a register file or in a table.

In a paging/segmentation scheme, the main memory is also divided into pages. However, each effective address is mapped to an intermediate or "virtual" address by a segmentation scheme before being mapped to a particular page in main memory. Again, the least significant bits of the effective address are used to identify a byte within the selected page. In some paging/segmentation schemes, both the page and the segments are fixed-size blocks. The PowerPC Architecture uses such an all fixed-size paging/segmentation addressing scheme.

A segmentation translation scheme may be implemented as either an associative table or a binary-indexed register file. Typically, a particular implementation depends upon how the data processing system adds translation mappings to its segment structure after it is unable to translate a particular effective address. In general, there are two broad methods to add translation mappings to a segment structure: a hardware tablewalk and a software tablewalk. In a hardware tablewalk, data processor 10 automatically searches a memory table for a necessary address translation. This function is invisible to the data processing system's operating system. Tables are appropriate in this case. In a software tablewalk, data processor 10 branches to a program subroutine that generates the necessary translation. This function is part of the data processing system's operating system. In this case, binary-indexed register files are appropriate.

SUMMARY OF THE INVENTION

In accordance with the present invention, there is disclosed an address translator which substantially eliminates disadvantages of known address translator.

An address translator translates a first address into a second address. The address translator has a multiplexer, a selecting circuitry, and a plurality of entries. The multiplexer receives a first address and a register number and outputs one, a "match tag," responsive to a first control signal. The selecting circuitry asserts one of a plurality of second control signals responsive to the register number. Each one of the plurality of entries has a tag means, a storage means and a wordline control circuit. The tag means stores a translation tag and asserts a third control signal if the translation tag is logically equivalent to the match tag. The storage means stores a second address. The wordline control circuit outputs the second address responsive to the tag means asserting the third control signal.

A method of operating an address translator is also described. The method has the steps of, during a first time, first receiving a register number in a one-of-N decoder and in a plurality of content addressable memory bit cells, second receiving a translated address in a plurality of bit cells, first writing the register number in the plurality of content addressable memory bit cells of a decoded one of a plurality of entries, and second writing the translated address in the plurality of bit cells of the decoded one of the plurality of entries. Each one of the plurality of entries has the plurality of content addressable memory bit cells and the plurality of memory bit cells. The plurality of content addressable memory bit cells store a translation tag. The plurality of memory bit cells store a translated address. The decoded one of the plurality of entries is selected responsive to the register number. The method also has the steps of, during a second time, third receiving a first address in the plurality of content addressable memory bit cells in each of the plurality of entries, first comparing the first address to each translation tag; and first outputting the translated address of a matched one of the plurality of entries. The matched one of the plurality of entries is selected responsive to the step of first comparing.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
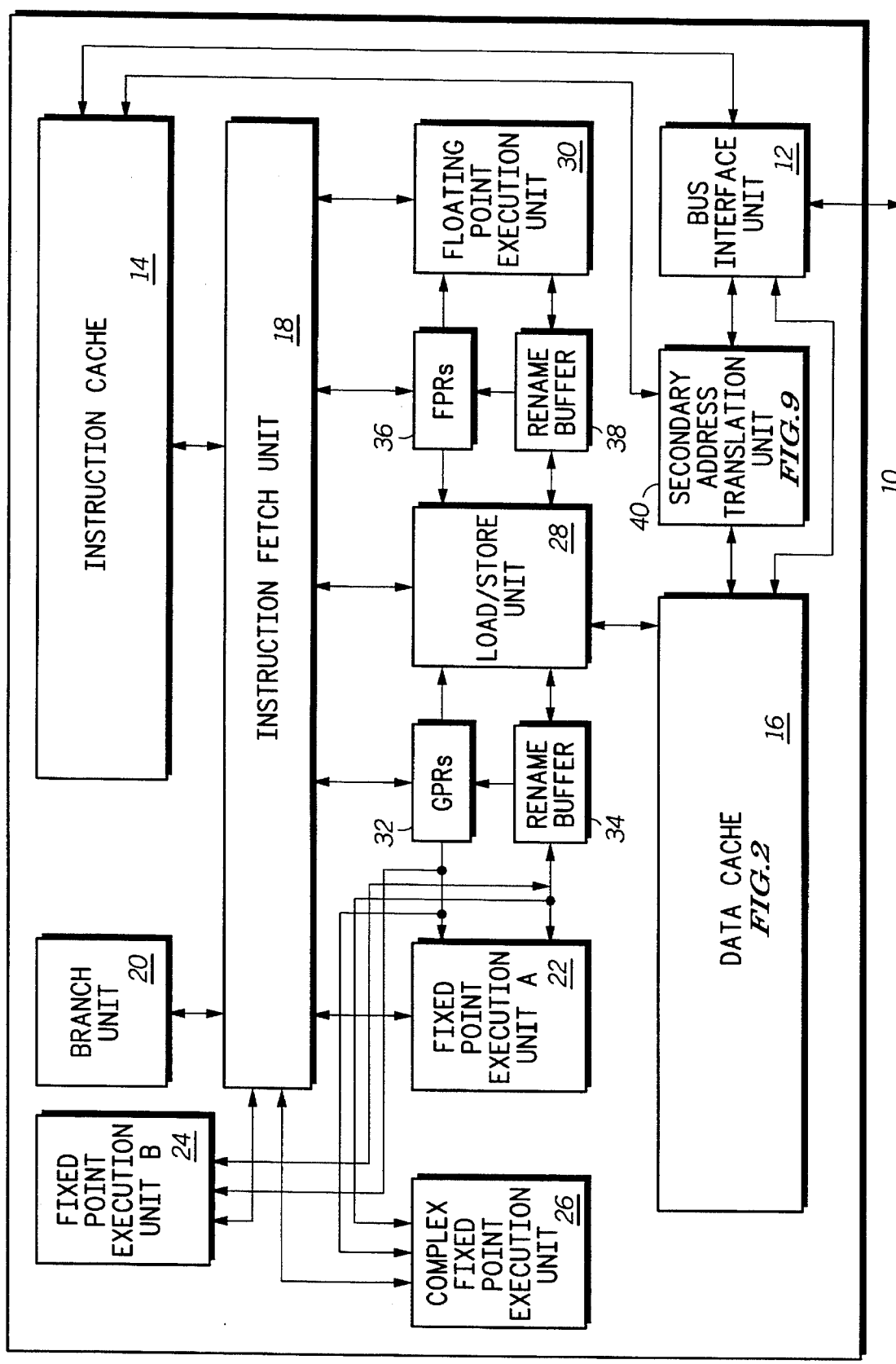
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by using a paging/segmentation address translation scheme. Data processor 10 maintains a twenty entry segment look-a-side buffer for storing twenty recently used effective-to-virtual translations. This segment look-a-side buffer can be accessed as a table or as a register file to make it compatible with two different address translation models. The segment look-a-side buffer stores its binary address in its CAM field during each segment register write instruction.

In a subsequent segment register read operation, the segment look-a-side buffer matches the input binary index against the CAM field. The segment look-a-side buffer does not select an entry by its binary index in a segment register read operation. The disclosed invention is compatible with both hardware and software tablewalk replacement algorithms. This strategy also avoids adding delay to the critical segment register read speed path.

1. DATA PROCESSOR OVERVIEW

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Data cache 16 is more fully described below in connection with FIGS. 2 through 8. Instruction cache 14 supplies an instruction stream to a instruction fetch unit 18. Instruction fetch unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 26 and load/store execution unit 28 read and write their results to a floating point architectural register file 36, (labeled FPRs and hereafter FPR file) and to a second rename buffer 38. Data processor 10 also has a secondary address translation unit 40 connected to BIU 12, to instruction cache 14 and to data cache 16. Secondary address translation unit 40 is more fully described below in connection with FIGS. 9 through 11.

The operation of data processor 10 without the disclosed invention is known in the art. In general, branch unit 20 determines what sequence of programmed instructions is appropriate given the contents of certain data registers and the instructions themselves. Instruction cache 14 provides this sequence of programmed instructions to instruction fetch unit 18. If instruction cache 14 does not contain the required instructions, then it will fetch them from a main memory system external to data processor 10 (not shown).

Instruction fetch unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Instruction fetch unit 18 coordinates this updating. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Instruction fetch unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to GPR file 32, first rename buffer 34, FPR file 36 or second rename buffer 38. If data cache 16 does not contain the required data, then it will fetch it from the main memory system external to data processor 10 via BIU 12.

The operation of data processor 10 with the disclosed data cache is described below in connection with FIGS. 2 through 11. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

In the depicted embodiment, each instruction is broken into as many as five discrete steps: fetch, dispatch, execute, write-back, and completion. Memory management circuitry (not shown) within instruction cache 14 retrieves one or more instructions beginning at a memory address identified by instruction fetch unit 18 or branch unit 20 during the fetch phase. Instruction fetch unit 18 routes each instruction to the appropriate execution unit after determining that there are no impermissible data dependencies and after reserving a rename buffer entry for the result of the instruction in the dispatch phase. Each particular execution unit executes its programmed instruction during the execution phase and writes its result, if any, to the reserved rename buffer entry during the write-back phase. Finally, instruction fetch unit 18 updates the architectural register files with the result of a particular instruction stored in a rename buffer after every instruction preceding the particular instruction has so updated the architectural register file. Generally, each instruction phase takes one machine clock cycle. However, some instructions require more than one clock cycle to execute while others do not require all five phases. There may also be a delay between the write-back and completion phases of a particular instruction due to the range of times which the various instructions take to complete.

2. DATA CACHE

A. Overview

Figure 2:
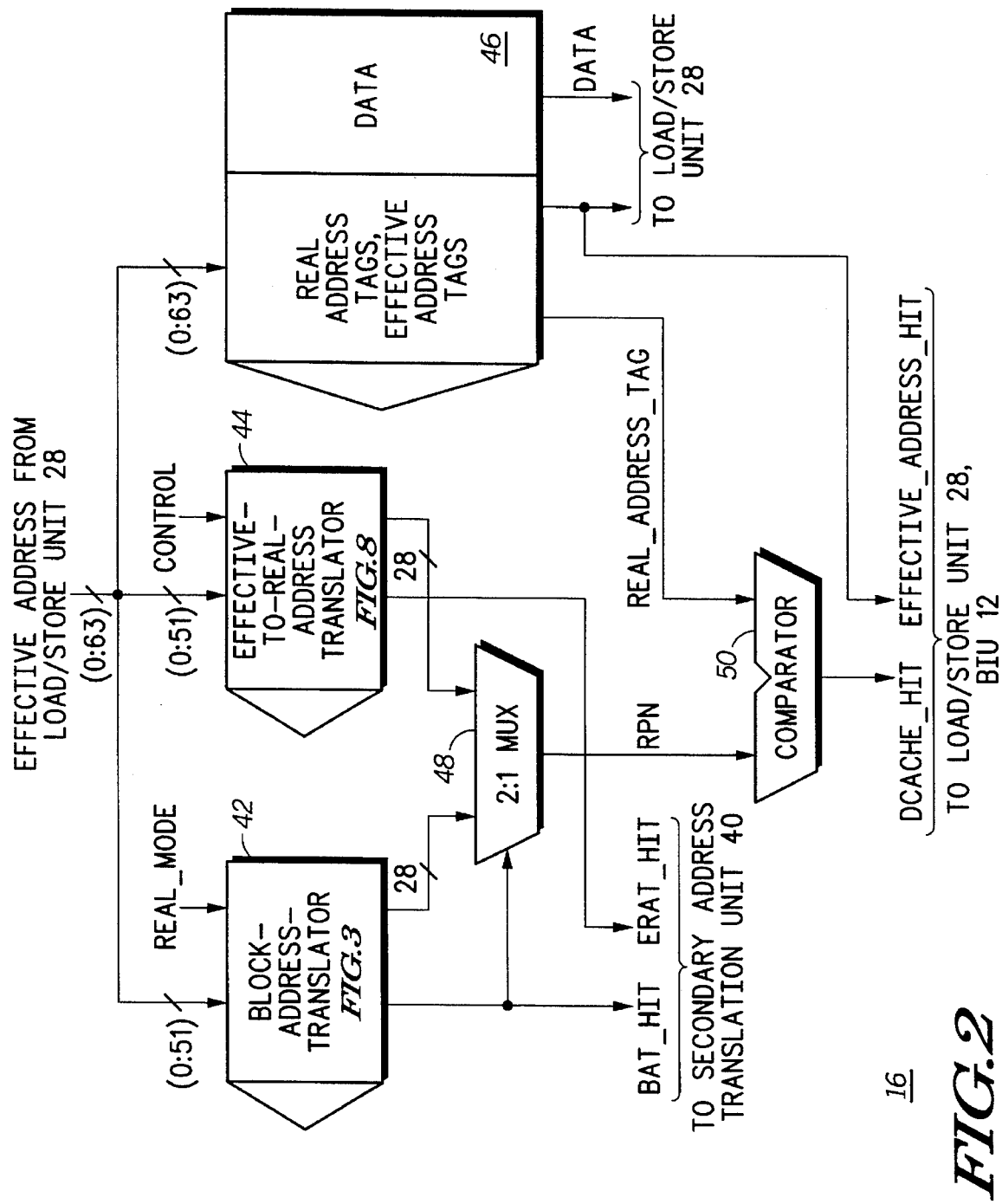
FIG. 2 depicts a block diagram of the data cache illustrated in FIG. 1.

FIG. 2 depicts a block diagram of data cache 16 illustrated in FIG. 1. It should be noted that instruction cache 14 and data cache 16 are substantially similar. The differences between the two structures primarily depend upon the use of the information stored in them. A block address translator ("BAT") 42, an effective-to-real-address-translator ("ERAT") 44, and a data array 46 receive an effective address of a data access from load/store unit 28 during each clock cycle of data processor 10. A 2:1 multiplexer (labeled MUX) 48 selects the address translation output generated by BAT 42 or by ERAT 44 according to an architected convention. In parallel with the address translation, data array 46 outputs a cache line and an associated real address tag associated with the presented effective address. A comparator 50 receives the address translation output by multiplexer 48 and the real address tag output by data array 46. If the address translation output and the real address tag are logically equivalent, then the data output to load/store unit 28 is in fact the requested data. Comparator 50 asserts DCACHE HIT in this case. If the address translation output and the real address tag are not logically equivalent, then the data output to load/store unit 28 is not the requested data. Comparator 50 de-asserts DCACHE HIT in this case. In this second case, BIU 12 will request the data from the memory system (not shown). BIU 12 will write the data into data array 46 once it receives the data from the memory system.

BAT 42 and ERAT 44 attempt to translate fifty-two most significant bits ("MSBs") of each 64-bit effective address presented to them by load/store unit 28. If successful, BAT 42 and ERAT 44 generate the twenty-eight MSBs of the real address corresponding to the presented effective address, a real page number ("RPN"). Each structure will also assert a hit signal indicating a successful translation. BAT 42 asserts the control signal BAT HIT if it successfully translates the effective address. ERAT 44 asserts the control signal ERAT HIT if it successfully translates the effective address. The full 40-bit real address of a particular effective address is generated by concatenating the effective address's RPN and the twelve least significant bits ("LSBs") of the effective address. In the PowerPC Architecture, the address translated by BAT 42 take precedence over the address translated by ERAT 44, if any. Therefore, the control signal BAT HIT causes multiplexer 48 to output the RPN generated by BAT 42 when the control signal is asserted. Conversely, the control signal BAT HIT causes multiplexer 48 to output the RPN generated by ERAT 44 when de-asserted. If neither BAT 42 nor ERAT 44 successfully translated a particular effective address, then secondary address translation unit 40 will attempt to translate the effective address. The control signals BAT HIT and ERAT HIT are routed to secondary address translation unit 40 to facilitate this act. BAT 42 is more fully described below in connection with FIGS. 3 though 7. ERAT 44 is more fully described below in connection with FIG. 8. Secondary address translation unit 40 is more fully described below in connection with FIGS. 9 though 11.

Data array 46 is a physically indexed semi-associative cache which acts like an eight-way set associative cache. Data array 46 contains 512 cache lines that each store four quad-words of data. The 512 cache lines are organized into two banks of thirty-two camlets. Each camlet contains eight cache lines. Every four quad-words of data may be mapped into any one of the eight different cache lines in a particular camlet. Each cache line in data array 46 stores a REAL ADDRESS TAG in a content addressable memory ("CAM"), an EFFECTIVE ADDRESS TAG in a CAM and four quad-words of data in a row of static random access memory ("SRAM") bit-cells. Each REAL ADDRESS TAG contains the twenty-eight most significant bits of the real address of the cache line entry. Each EFFECTIVE ADDRESS TAG contains the eight most significant bits of the effective address of the cache line entry.

Data array 46 indexes into one camlet with effective address bits (52:57) for each effective address that load/store unit 28 presents to it. Simultaneously, data array 46 attempts to match effective address bits (44:51) with one of the eight EFFECTIVE ADDRESS TAGs in the one selected camlet. If data array 46 finds an EFFECTIVE ADDRESS TAG match in the one camlet, then an effective address hit occurs and data array 46 asserts a control signal EFFECTIVE ADDRESS HIT. In this case, data array 46 outputs the associated one hundred and twenty-eight bits to load/store unit 28. At this point, the effective address hit is only a possible hit. As described above, comparator 50 determines if each effective address hit is an actual data cache hit by comparing the RPN output by multiplexer 48 and the REAL ADDRESS TAG of the selected one camlet. If data array 46 does not find an EFFECTIVE ADDRESS TAG match in the one camlet, then a cache miss occurs and data array 46 de-asserts the control signal EFFECTIVE ADDRESS HIT. In this case, BIU 12 request the data beginning at the forty-bit real address generated by concatenating the RPN and the twelve LSBs of the presented effective address.

B. Block Address Translator i. Overview

Figure 3:
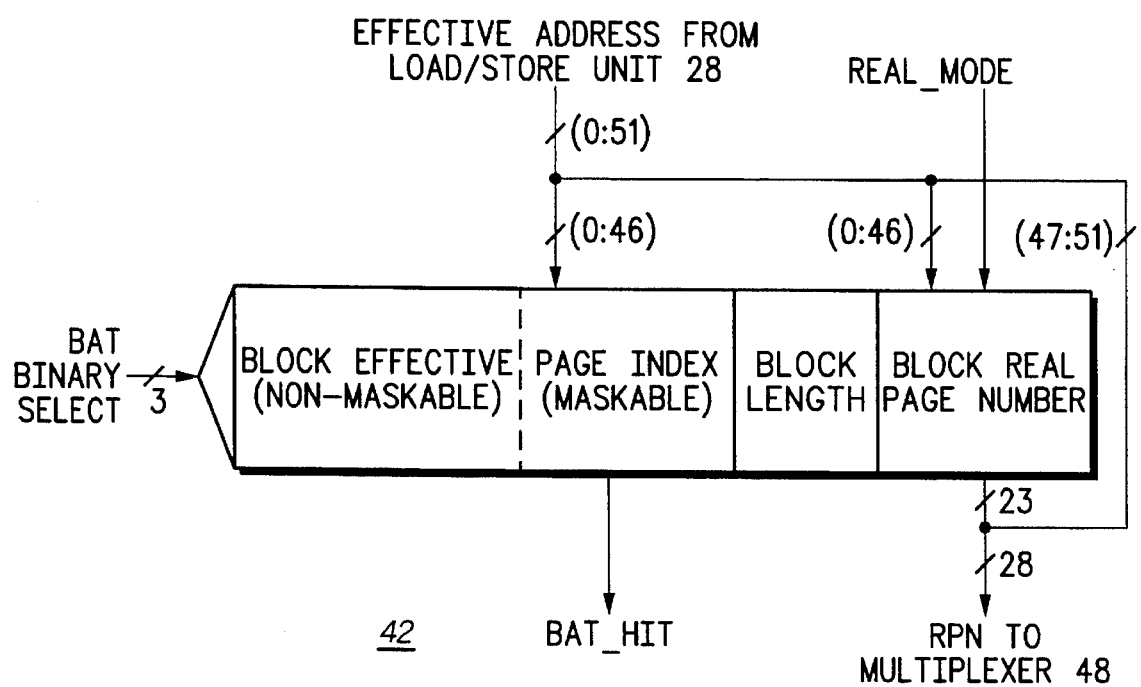
FIG. 3 depicts a block diagram of the block-address-translator illustrated in FIG. 2.

FIG. 3 depicts a block diagram of BAT 42 illustrated in FIG. 2. In a first mode of operation, BAT 42 provides a mechanism for mapping ranges of virtual addresses larger than a single page onto contiguous areas of real storage. BAT 42 contains four entries for mapping input effective address from load/store unit 28 to four possible real address locations. This mode of operation is referred to as the "effective mode." In a second mode of operation, BAT 42 simply passes the input effective address to its output as a real address. This mode is referred to as the "real mode." The two addressing modes are controlled by the control signal REAL MODE. A single bit in a user-visible special purpose register (not shown) generates the control signal REAL MODE.

Each one of the four entries in BAT 42 stores a forty-seven bit block effective page index ("BEPI"), an eleven bit block length tag ("BL tag"), and a twenty-three bit block real page number ("BRPN"). Each entry in BAT 42 also stores various bits (not shown) that define certain characteristics of the real memory space referenced by the entry's BRPN. These bits are not relevant to the disclosed invention. The four BEPIs are stored in CAM structures. The four BL tags and the four BRPNs are stored in SRAM bit cells. A particular entry's BRPN is read from by matching the contents of the entry's BEPI with an input effective address as described below. A particular entry's BRPN is written to by inputting the entry's binary index (000 though 111) on the control signal BAT BINARY SELECT and by providing the appropriate input data to the BRPN.

During an effective to real address translation, the thirty-six MSBs of each presented effective address are always matched against the thirty-six MSBs of the four BEPIs. However, in the PowerPC Architecture, each of the eleven least significant bits of the BEPI may or may not be matched against the corresponding eleven effective address bits depending upon the data stored in the BL tag. This feature allows the user of data processor 10 to define different block sizes. For instance if the second entry's BL tag is logically equivalent to (000 0000 0011, MSB to LSB), then the forty-five MSBs of the second entry's BEPI (36+6) must match the forty-five MSBs of the input effective address to select the second entry's BRPN. In this case, the block is 512 KB in size. If the second entry's BL tag is logically equivalent to (000 0001 1111, MSB to LSB), then the forty-two MSBs of the second entry's BEPI (36+6) must match the forty-two MSBs of the input effective address to select the second entry's BRPN. In this case, the block is 4 MB in size. It should be understood that each entry in BAT 42 may have a different value.

BAT 42 outputs a twenty-three bit data stream for address translation purposes in two instances. First, BAT 42 outputs the BRPN if the associated BEPI matches the input effective address and if data processor 10 is operating in the virtual mode. In the virtual mode, BAT 42 generates the BRPN by concatenating the twelve MSBs of the BRPN with either the remaining BRPN LSBs if not masked or the corresponding effective address bits if masked, on a bit-by-bit basis. In the first example above, the BRPN would consist of the concatenation of (1) the twelve MSBs of the selected BRPN, (2) the nine next-MSBs of the selected BRPN, and (3) effective address bits (45:46). In the second example above, the BRPN would consist of the concatenation of (1) the twelve MSBs of the selected BRPN, (2) the six next-MSB s of the selected BRPN, and (3) effective address bits (42:46). Second, BAT 42 outputs the twenty-three MSBs of the input effective address if data processor 10 is operating in the real mode. The RPN received by multiplexer 48 (FIG. 2) is itself the concatenation of the BRPN described above and effective address bits (47:51).

ii. Balanced maskable/non-maskable CAMs

Figure 4:
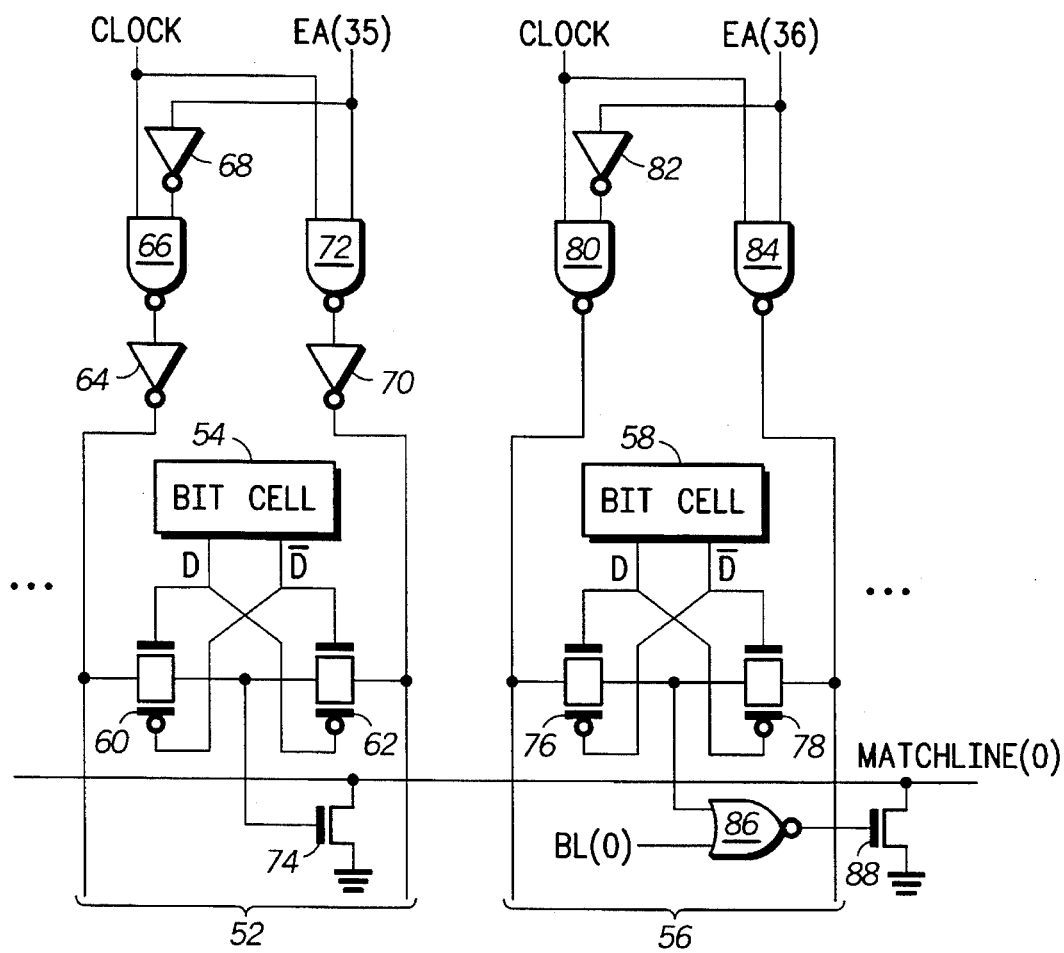
FIG. 4 depicts a circuit diagram of a first portion of the block address translator illustrated in FIG. 3.

FIG. 4 depicts a circuit diagram of a first portion of BAT 42 illustrated in FIG. 3. FIG. 4 depicts the thirty-sixth and thirty-seventh CAM cells in the first entry of BAT 42. CAM cell 52 stores the thirty-sixth bit of the first entry's BEPI in a bit cell 54. As described above, CAM cell always compares the thirty-sixth bit of an effective address and the data stored in bit cell 54. Therefore, CAM cell 52 need not be maskable. CAM cell 56 stores the thirty-seventh bit of the first entry's BEPI in a bit cell 58. As described above, CAM cell 52 may or may not compare the thirty-seventh bit of an effective address and the data stored in bit cell 58. This conditional comparison depends upon the value of the MSB of the first entry's BL tag. Therefore, CAM cell 52 must be maskable. Although more functional, CAM cell 52 is generally as fast as CAM cell 52. This feature simplifies design without denigrating performance.

It should be understood that there are thirty-five CAM cells immediately to the left of CAM cell 52 which are identical to CAM cell 52. These CAM cells store the first through thirty-fifth bits of the first entry's BEPI. This structure is reflected by the horizontal ellipses to the left of CAM cell 52. Similarly, there are ten CAM cells immediately to the right of CAM cell 56 which are identical to CAM cell 56. These CAM cells store the thirty-eighth through forty-seventh bits of the first entry's BEPI. This structure is reflected by the horizontal ellipses to the right of CAM cell 56. The placement of these ten CAM cells alternate with eleven bit cells storing the eleven BL tag bits for the first entry. The layout of BAT 42 is described below in connection with FIG. 7. Also, there are three rows of CAM cells and BL tag bit cells below the depicted partial row. These three rows store the second, third and fourth BEPIs and the second, third and fourth BL tags. This structure is reflected by the vertical ellipses below CAM cells 52 and 56.

Continuing with FIG. 4, bit cell 54 outputs a stored logic state and its complement on a data signal (labeled "D") and a data-bar signal (labeled "$\overline{D}$"), respectively. The data signal is connected to an n-type device of a pass gate 60 and to a p-type device of a pass gate 62. The data-bar signal is connected to a p-type device of pass gate 60 and to an n-type device of pass gate 62. A first current electrode of pass gate 60 is connected to an output of an inverter 64. An input of inverter 64 is connected to an output of a NAND gate 66. A first input of NAND gate 66 receives a periodic clocking signal, CLOCK. A second input of NAND gate 66 is connected to an output of an inverter 68. An input of inverter 68 receives the thirty-sixth bit of the effective address EA. (EA(0) is the first bit of the effective address). A first current electrode of pass gate 62 is connected to an output of an inverter 70. An input of inverter 70 is connected to an output of a NAND gate 72. A first input of NAND gate 72 receives the periodic clocking signal, CLOCK. A second input of NAND gate 72 receives the thirty-sixth bit of the effective address. A second current electrode of each of pass gates 60 and 62 is connected to the control electrode of an n-type transistor 74. A first current electrode of transistor 74 is connected to a matchline node common to CAM cells in the first entry. The voltage present on the matchline node generates a signal MATCHLINE. A second current electrode of transistor 74 receives a first voltage supply, conventionally depicted as ground.

Bit cell 58 also outputs a stored logic state and its complement on a data signal (labeled "D") and a data-bar signal (labeled "$\overline{D}$"), respectively. The data signal is connected to an n-type device of a pass gate 76 and a p-type device of a pass gate 78. The data-bar signal is connected to a p-type device of pass gate 76 and to an n-type device of pass gate 78. A first current electrode of pass gate 76 is connected to an output of a NAND gate 80. A first input of NAND gate 80 receives the periodic clocking signal, CLOCK. A second input of NAND gate 80 is connected to an output of an inverter 82. An input of inverter 82 receives the thirty-seventh bit of the effective address EA. A first current electrode of pass gate 78 is connected to an output of a NAND gate 84. A first input of NAND gate 84 receives the periodic clocking signal, CLOCK. A second input of NAND gate 84 receives the thirty-seventh bit of the effective address EA. A second current electrode of each of pass gates 76 and 78 is connected to a first input of a NOR gate 86. A second input of NOR gate 86 receives a first bit of the first entry's BL tag, BL(0). An output of NOR gate 86 is connected to a control electrode of an n-type transistor 88. A first current electrode of transistor 88 is connected to the matchline node. A second current electrode of transistor 88 receives the first voltage supply.

CAM cells 52 and 56 perform three functions: compare, write and read.

In a compare operation (the periodic clocking signal CLOCK corresponds to a high logic state), the forty-seven MSBs of an effective address are compared to the forty-seven stored bits of each of the four BEPIs. If all forty-seven pairs of effective address and stored data bits are logically equivalent in a particular entry of BAT 42, then the entry's matchline node will remain in a precharged state (high). The voltage present on the matchline node can then be buffered to drive a control signal that couples the entry's BRPN bit cells to a series of output bit lines. If any one or more pairs of effective address and stored data bits are not logically equivalent in a particular entry of BAT 42, then the particular entry's matchline node will discharge to ground. In this case, the entry's BRPN bit cells will not be coupled to the output bit lines. It should be noted that CAM cells 52 and 56 are configured differently. Pass gates 60 and 62 pass the logical complement of the input effective address bit to the control electrode of transistor 74. Conversely, pass gates 76 and 78 pass the input effective address bit to the first input of NOR gate 86. This difference allows CAM cell 56 to not discharge the matchline node if the first BL tag bit corresponds to a high logic state.

The contents of bit cell 54 may be written to by connecting a bit-line to a write port of bit cell 54 (neither shown). Typically, a decoded version of the BAT BINARY SELECT signal is used to accomplish this connecting. Whatever logic state is present on the bit-line is written to bit cell 54. Conversely, the contents of bit cell 54 may be read from by connecting the bit-line to a write port of bit cell 54 and connecting a sense amplifier (neither shown) to the bit-line.

iii. Distributed multiplexer

Figure 5:
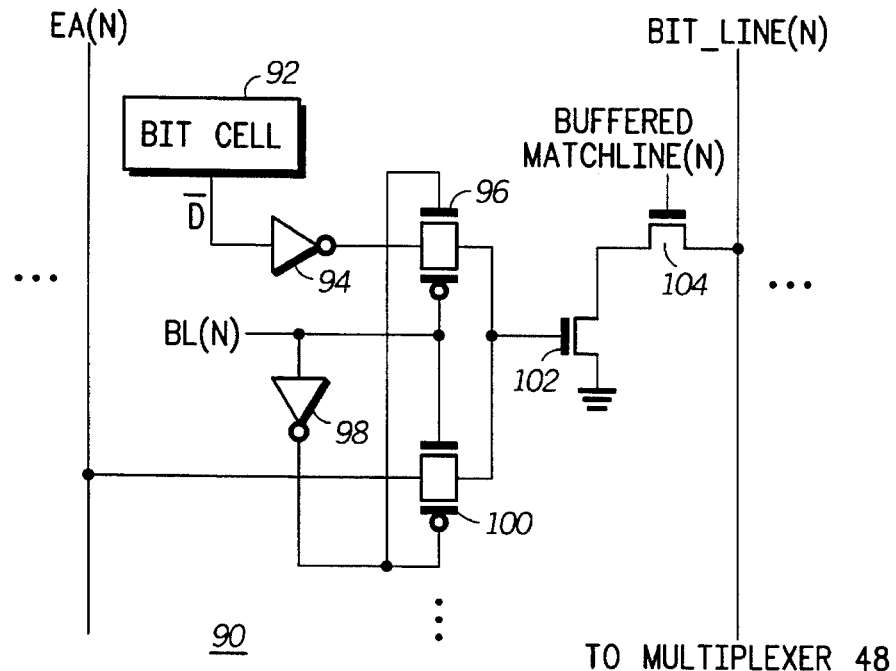
FIG. 5 depicts a circuit diagram of a second portion of the block address translator illustrated in FIG. 3.

FIG. 5 depicts a circuit diagram of a second portion of BAT 42 illustrated in FIG. 3. FIG. 5 depicts a distributed multiplexing circuit 90 associated with an Nth BRPN bit cell 92 in the first entry of BAT 42, where N is an integer index. Bit cell 92 stores the Nth bit of the first entry's BRPN. As described above, BAT 42 always outputs the twelve MSBs of an entry's BRPN if that entry is selected in a match operation. BAT 42 will also output some of the remaining eleven LSBs depending upon the entry's BL tag. If BAT 42 does not output a particular one of the remaining eleven BRPN bits, then it will output the corresponding effective address bit. The depicted circuit multiplexes between each effective address and BRPN bit pair while the entry simultaneously performs a CAM operation. BAT 42 can perform this multiplexing operation faster than it can perform the CAM'ing operation. Therefore, the time penalty associated with the block length function is hidden underneath the CAM'ing operation and from the speed path of data cache 16.

It should be understood that there are ten other circuits identical to that depicted in FIG. 5 in the first entry of BAT 42. These eleven circuits store and output the eleven LSBs of the first entry's BRPN. This structure is reflected by the horizontal ellipses to the left and right of the circuit depicted in FIG. 5. Also, there are three rows of eleven distributed multiplexing circuits 90 below the depicted partial row. These three rows store the eleven LSBs of the second, third and fourth BRPNs. This structure is reflected by the vertical ellipses below distributed multiplexing circuit 90. The thirty-six MSBs of each BRPN simply contain a bit cell 92. The depicted embodiment is a sixty-four bit data processor. However, each real address is only allowed to be forty bits in length. Therefore, the twenty-four MSBs of each BRPN are not connected to multiplexer 48.

Continuing with FIG. 5, a data-bar output signal (labeled "$\overline{D}$") of bit cell 92 is connected to an input of an inverter 94. (The data output signal of bit cell 92, not shown, is used as a write port.) An output of inverter 94 is connected to a first current electrode of a pass gate 96. An Nth bit of the first entry's BL tag, BL(N) is connected to an input of an inverter 98, to a p-type device of pass gate 96, and to an n-type device of pass gate 100. An output of inverter 98 is connected to an n-type device of pass gate 96 and to a p-type device of a pass gate 100. A second current electrode of each of pass gates 96 and 100 is connected to the control electrode of an n-type transistor 102. A first current electrode of transistor 102 is connected to a first current electrode of an n-type transistor 104. A second current electrode of transistor 102 receives the first voltage supply. A control electrode of transistor 104 receives a buffered version of the control signal MATCHLINE described above in connection with FIG. 4. A second current electrode of transistor 104 is connected to the Nth bit line (labeled "BIT LINE(N)"). The Nth bit line is described below more fully in connection with FIG. 6.

Distributed multiplexer circuit 90 performs two functions: compare/read, and write.

In a compare/read operation, one of four MATCHLINE signals will remain in a precharged state if the BEPI corresponding to the one of four MATCHLINE signals matches the input effective address. In this case, transistor 104 will connect the first current electrode of transistor 102 to the output bit line. If the Nth bit of the BL tag corresponds to a low logic state, then the data signal output of the Nth bit cell 92 (the inversion of the data-bar output signal) will pass to the control electrode of transistor 102. If the Nth bit of the BL tag corresponds to a high logic state, then the Nth bit of the effective address will pass to the control electrode of transistor 102. In both cases, circuitry (not shown) precharges the first current electrode of transistor 102 to a high logic state. The logic state output on the Nth bit line is the logical complement of the Nth bit cell 92 or the Nth effective address bit. (This output is inverted as described in connection with FIG. 6.) The one of four MATCHLINE signals will discharge to a low logic state if the BEPI corresponding to the one of four MATCHLINE signals does not match the input effective address. In this case, transistor 104 will not connect the first current electrode of transistor 102 to the output bit line.

As described above, the twenty-four MSBs of a particular BRPN are not connected to multiplexer 48. The next twelve MSBs of a particular BRPN are always output if the CAM match operation selects the particular BRPN. There are no BL tag bits for these twelve bits. Therefore, the input of inverter 98, the n-type device of pass gate 96, and the p-type device of pass gate 100 receive a voltage level corresponding to a high logic state. This forces distributed multiplexer circuit 90 to output the data-bar output of bit cell 92.

The contents of bit cell 92 may be written to by connecting a bit-line signal to a write port (not shown). Typically, a decoded version of the BAT BINARY SELECT signal is used to accomplish this connecting. Whatever logic state is present on the bit-line signal is written to bit cell 92.

iv. Real mode by-pass circuit

Figure 6:
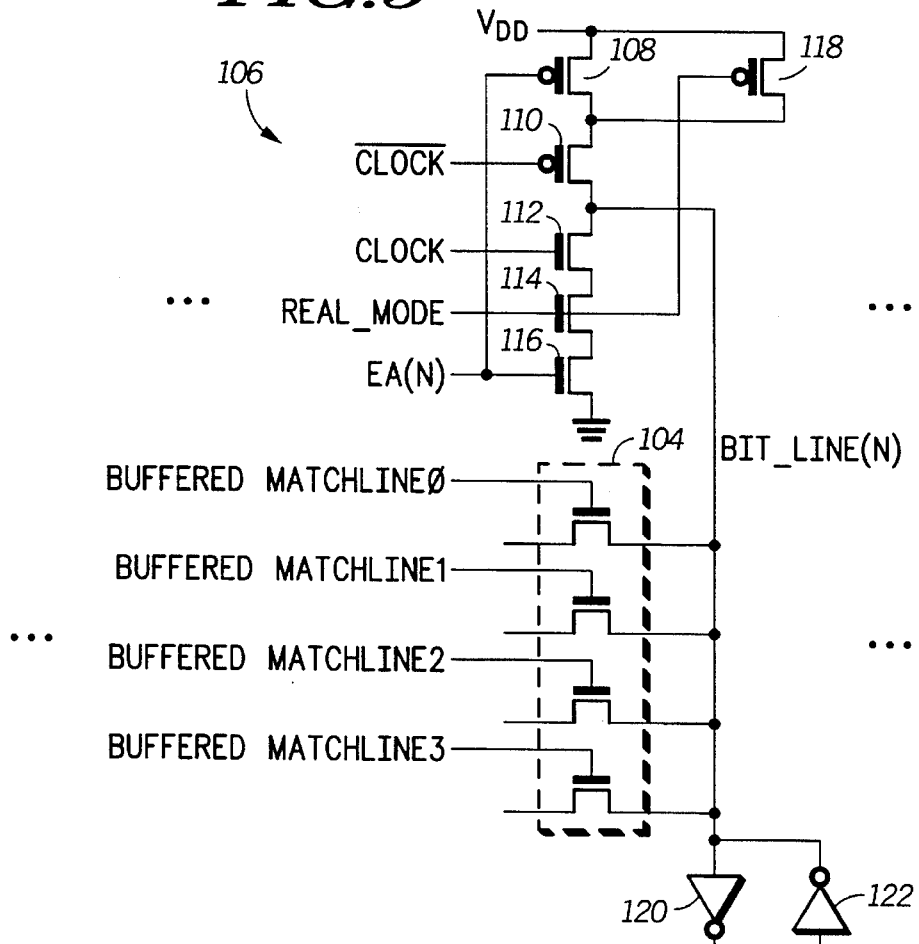
FIG. 6 depicts a circuit diagram of a third portion of the block address translator illustrated in FIG. 3.

FIG. 6 depicts a circuit diagram of a third portion of the BAT 42 illustrated in FIG. 3. FIG. 6 depicts a by-pass circuit 106 coupled to the Nth BRPN bit line. As described in connection with FIGS. 4 and 5, BAT 42 outputs a particular entry's twenty-three BRPN bits on twenty-three bit lines if the particular entry's BEPI matches an input effective address. This mode of operation is called an "effective-mode." By-pass circuit 106 also provides a pathway for the effective address to be output to multiplexer 48. This mode of operation is called an "real-mode." By-pass circuit 106 provides this output path without adding an additional two-to-one multiplexer between the bit lines and multiplexer 48 or by replacing two-to-one multiplexer 48 with a three-to-one multiplexer.

It should be understood that there are forty-six other by-pass circuits identical to that depicted in FIG. 6. These forty-six by-pass circuits are connected to the other forty-six BRPN bit lines of BAT 42. This structure is reflected by the horizontal ellipses to the left and right of the circuit depicted in FIG. 6. The BRPN bits are connected to their respective bit lines through a corresponding transistor 104. The Nth BRPN bit of each of the four entries in BAT 42 is connected to the Nth bit line. As described above, the twenty-four MSBs of the BRPN are not implemented in the depicted embodiment. These twenty-four bit lines are not connected to multiplexer 48. Only the twenty-three LSB bit lines are output to multiplexer 48.

Continuing with FIG. 6, by-pass circuit 106 has five transistors 108, 110, 112, 114, and 116 connected in series between a second voltage supply (labeled VDD) and the first voltage level. In particular, a first current electrode of transistor 108 receives the second voltage supply. A second current electrode of transistor 108 is connected to a first current electrode of transistor 110. A second current electrode of transistor 110 is connected to a first current electrode of transistor 112. A second current electrode of transistor 112 is connected to a first current electrode of transistor 114. A second current electrode of transistor 114 is connected to a first current electrode of transistor 116. A second current electrode of transistor 116 receives the first voltage supply. A control electrode of transistors 108 and 116 receive the Nth bit of the effective address EA presented to BAT 42. A control electrode of transistor 110 and a control electrode of transistor 112 the logical complement of the periodic clocking signal CLOCK and CLOCK, respectively. A control electrode of transistor 114 receives the control signal REAL MODE. A first and a second current electrode of a transistor 118 is connected to the first and second current electrode of transistor 108, respectively. A control electrode of transistor 118 receives the control signal REAL MODE. The second current electrode of transistor 110 is connected to the Nth BRPN bit line. Transistor 108, 110 and 118 are p-type devices. Transistors 112, 114, and 116 are n-type devices. The Nth bit line is connected to an input of a first inverter 120. An output of inverter 120 is connected to multiplexer 48 and to an input of a second inverter 122. An output of inverter 122 is connected to the input of inverter 120.

By-pass circuit 106 operates in two modes: effective and real. In both modes, by-pass circuit 106 precharges the bit line when the periodic clocking signal CLOCK corresponds to a high logic state (and $\overline{\text{CLOCK}}$ corresponds to a low logic state). By-pass circuit 106 then determines or "evaluates" the bit line output when the periodic clocking signal CLOCK corresponds to a low logic state (and $\overline{\text{CLOCK}}$ corresponds to a high logic state). In the effective mode, a single bit in a user-visible special purpose register (not shown) de-asserts the control signal REAL MODE causing the BRPN bit lines to output the selected BRPN. Transistors 110 and 118 pre-charge the bit line to a high voltage level (VDD). Each bit in the selected BRPN may or may not discharge each corresponding bit line depending upon the value of the bit. In the real mode, the control signal REAL MODE is asserted and the BRPN bit lines operate to output the input effective address EA. Transistors 108 and 110 pre-charge the bit line to a high voltage level (VDD) if the value of the Nth effective address bit corresponds to a low logic state. Conversely, transistors 114 and 116 precharge the bit line to a low voltage level (ground) if the value of the Nth effective address bit corresponds to a high logic state. The four buffered MATCHLINE signals are gated by the complement of the control signal REAL MODE to prevent the contents of one or more BRPNs from discharging the bit lines in the real mode.

v. Block address translator layout

Figure 7:
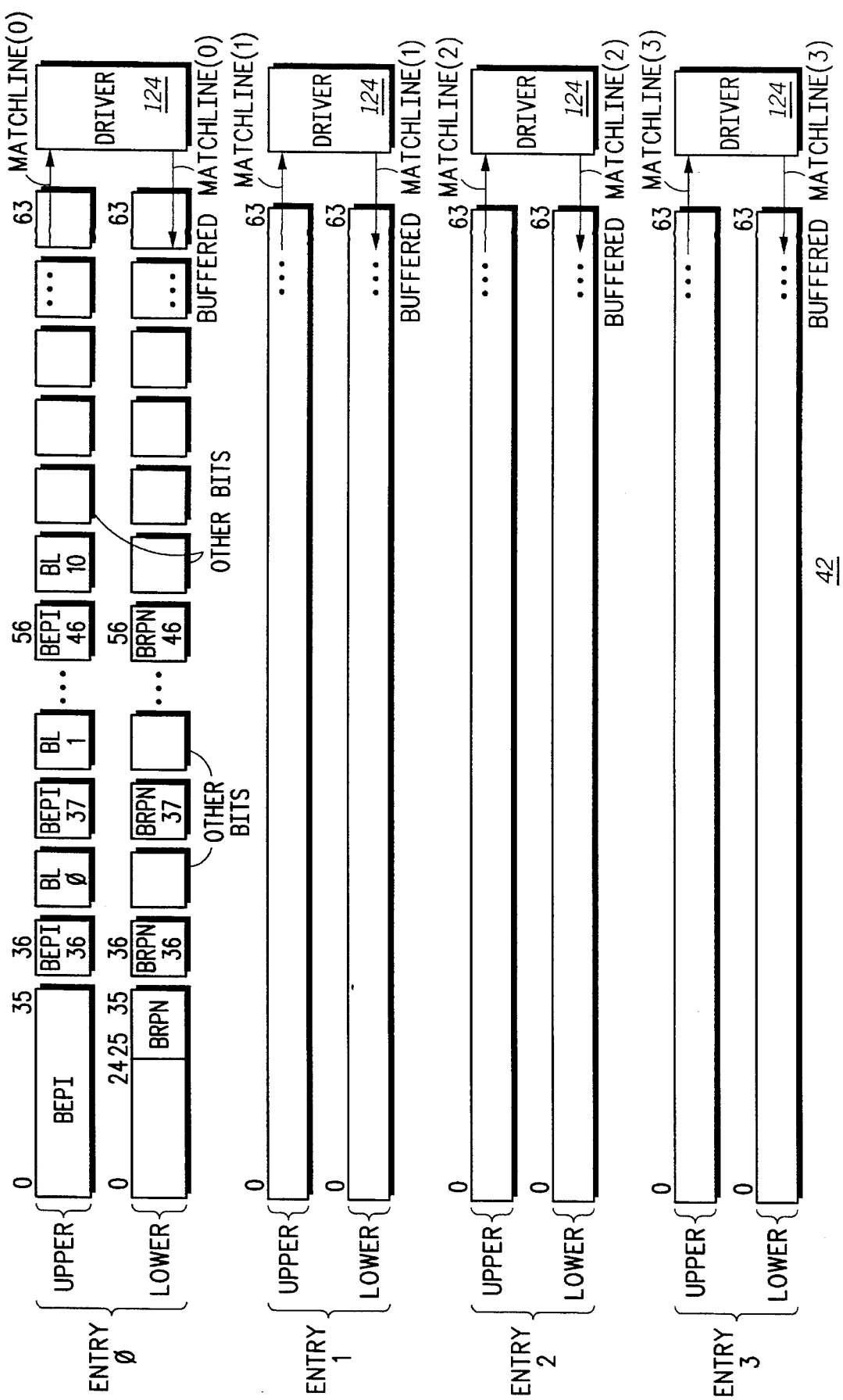
FIG. 7 depicts a block diagram of the bit cell layout of the block-address-translator illustrated in FIG. 2.

FIG. 7 depicts a block diagram of the bit cell layout of BAT 42 illustrated in FIG. 2. The arrangement of the BL tag bit cells relative to the maskable BEPI bit cells and the multiplexed BRPN bit cells reduces the complexity of bit cell interconnection. This simplified interconnection reduces the size and capacitance of the resulting circuit, thereby increasing its overall performance.

In the depicted embodiment, data processor 10 is a sixty-four bit data processor. Therefore, BAT 42 uses two sixty-four bit registers (labeled UPPER and LOWER) to store the BEPI, BL tag, BRPN, and the various other bits constituting each entry of BAT 42 (labeled ENTRY0 through ENTRY3). Only the two registers corresponding to the "zeroth" entry of BAT 42 are described below. However, it should be understood that the remaining three entries are identical.

Continuing with FIG. 7, each BL tag bit cell is located immediately to the right of the BEPI bit cell it masks. For instance, the first or "zeroth" BL tag bit cell, BL0, is located immediately to the right of the thirty-seventh BEPI bit cell, BEPI36. As described above, the thirty-six MSBs of the BEPI are always compared to the input effective address EA. These BEPI bits do not have a corresponding BL tag bit. Therefore, the thirty-six CAM cells storing the thirty-six MSBs of the BEPI are laid-out without interruption. The thirty-sixth and thirty-seventh CAM cells are described above in connection with FIG. 4.

Also, each of the bit cells storing the BRPN is aligned under the corresponding BEPI bit. For instance, the thirty-seventh BRPN bit cell, BRPN 36, is located immediately below the thirty-seventh BEPI bit cell, BEPI36. As described above, the twelve MSBs of the BRPN (BRPN 24 through BRPN 35) are always output after a successful match. These BRPN bits do not have a corresponding BL tag bit. Therefore, the twelve SRAM bit cells storing the twelve MSBs of the BRPN are laid-out without interruption. (The twenty-four bits of the BRPN not connected to multiplexer 48, BRPN0 through BRPN23, are also laid-out without interruption immediately to the left of the bits cells storing the twelve MSBs of the BRPN.) The multiplexed BRPN bit cells are described above in connection with FIG. 5.

The bit cells labeled "OTHER BITS" store information describing access right to the translated address, validity of the associated BRPN, etc. Each entry's MATCHLINE control signal exits the right side of the upper sixty-four bit register and enters a driver circuit 124. Driver circuit 124 buffers the control signal MATCHLINE, gates it with the control signals REAL MODE and BAT BINARY (not shown), and returns it to both sixty-four bit registers.

The interleaving of maskable BEPI CAM cells and BL tag bit cells and the alignment of multiplexed BRPN bits cells and BL tag bit cells reduces the distance between the BL tag bits and the various circuits which use them. Also, only a single input line is required to route each bit of the effective address to both the corresponding BEPI CAM cell (for a match) and to the corresponding BRPN bit cell (to be multiplexed with the stored BRPN bit). The resulting interconnections are thereby simplified. This interconnection strategy has at least three advantages. First, fewer metal layers are needed for interconnection because most interconnections are local or nearly local, i.e. between adjacent circuits. Second, fewer interconnections reduces the overall size of BAT 42. A smaller size lowers the cost of the circuit in terms of area. Third, shorter and fewer interconnections reduces the capacitance of the resulting circuit. Reduced capacitance increases the maximum frequency at which BAT 42 can operate.

C. Effective-to-Real-Address Translator

Figure 8:
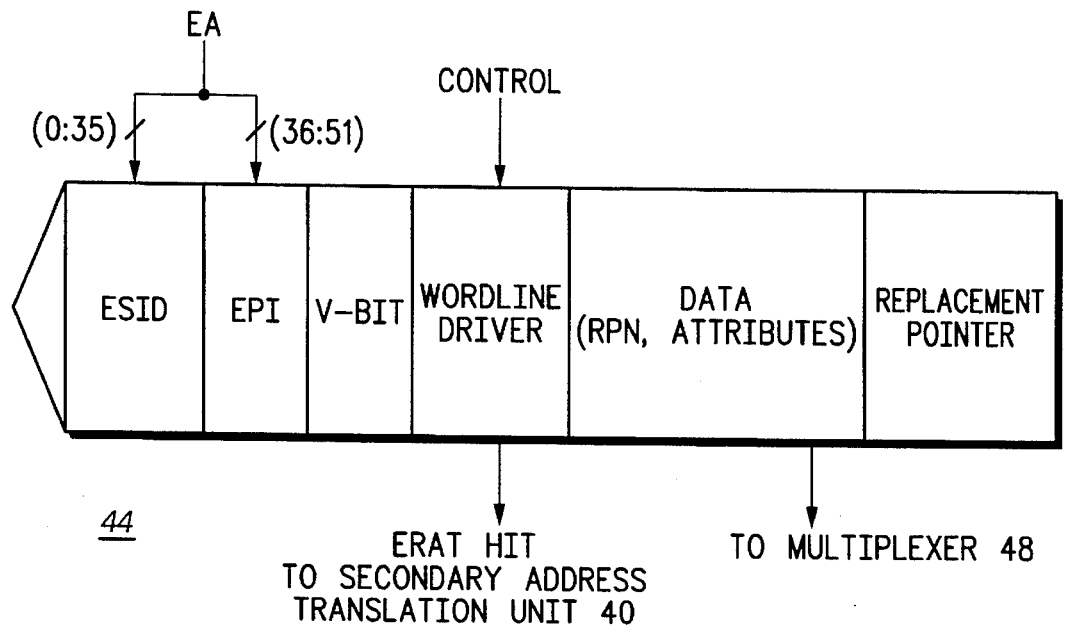
FIG. 8 depicts a block diagram of the effective-to-real-address-translator illustrated in FIG. 2.

FIG. 8 depicts a block diagram of ERAT 44 illustrated in FIG. 2. ERAT 44 caches sixty-four recently used effective-to-real address translations. Any one of these sixty-four translations can be accessed by a single look-up operation: no intermediate virtual address translation step is required. However, ERAT 44 supports entry invalidate operations on a segment and page granularity. Therefore, ERAT 44 is both fast and compatible with the paging/segmentation translation schemes.

ERAT 44 is a sixty-four entry CAM/SRAM structure. Each entry contains thirty-six CAM cells connected to a first matchline storing an effective segment identifier or "ESID," sixteen CAM cells connected to a second matchline storing an effective page identifier or "EPI," a V-BIT cell storing a valid entry bit, a wordline driver, a row of SRAM data bit cells, and a REPLACEMENT POINTER bit cell, storing an entry replacement pointer. An effective address ESID is the thirty-six MSBs of the effective address. An effective address's EPI is the next sixteen MSBs of the effective address, EA(36:51). Each ESID and EPI CAM cell are similar to CAM cell 52 depicted in FIG. 4. However, the thirty-six ESID CAM cells in each entry are connected to a first matchline. The sixteen EPI CAM cells in each entry are connected to a second matchline. Each category of CAM cell independently discharges its respective matchline. Each entry in ERAT 44 maps one effective page to an RPN stored in the DATA field. The thirty-six MSBs of the mapped effective address are stored in the ESID CAM. The next sixteen MSBs of the mapped effective address are stored in the EPI CAM. The corresponding real page number for the translation is stored in the data array. A real address is generated from the RPN by concatenating the RPN with the twelve LSBs of the effective address. ERAT 44 also outputs various bits describing attributes about the resulting page such as access privileges, cacheability, etc.

ERAT 44 performs five functions: translation, refill after miss, segment look-a-side buffer invalidate entry ("SLBIE"), table look-a-side buffer invalidate entry ("TLBIE"), and segment look-a-side buffer invalidate all ("SLBIA"). BIU 12, data cache 16, and instruction fetch unit 18 generate the signals CONTROL depending upon the function that ERAT 44 is to perform.

ERAT 44 performs a translation operation when data cache 16 performs a load or a store instruction. In a translation operation, ERAT 44 attempts to output an RPN corresponding to the effective address of instruction's memory location. ERAT 44 determines if it contains the necessary mapping by applying the thirty-six MSBs of the effective address to each ESID and by applying the next sixteen MSBs to each EPI. If both the ESID and the EPI of a particular valid entry match the input effective address, then both the first and the second matchlines will remain in a precharged state. The particular entry's wordline driver will then assert the entry's wordline, coupling the bit cells of the corresponding data field to the output bit lines and, ultimately, to multiplexer 48. The particular entry's wordline driver will assert the control signal ERAT HIT. If either or both the ESID and the EPI of a particular entry do not match the input effective address, then either or both the first and the second matchlines will be discharged. In this case, the particular entry's wordline driver will not assert the entry's wordline. If none of the entries contains a matching mapping, then no wordline driver circuit will assert ERAT HIT, an ERAT miss. As described below, secondary translation unit 40 will attempt to translate the effective address in the case of an ERAT miss. Data processor 10 can also use this method to update the attribute bits of a particular entry by applying a predetermined voltage level to the bit lines of the selected attribute bit cell.

ERAT 44 performs a refill after miss operation some time after unsuccessfully translating an effective address. In these cases, secondary translation unit 40 supplies the appropriate translation to ERAT for future use. Secondary translation unit 40 supplies the translation's ESID, EPI, RPN, and attribute data to the ESID CAM, EPI CAM and DATA bit lines (not shown), respectively, of a selected entry. A ring counter (not shown) selects the entry for replacement. This ting counter sequentially examines one V-BIT each clock cycle until either (1) it encounters an invalid V-BIT entry, or (2) secondary translation unit 40 begins a refill after miss operation. In either case, the ring counter ceases its examination and points to the last examined entry. The ring counter indicates the last examined entry by writing a first logic state to the last examined entry's REPLACEMENT POINTER bit cell and by writing a second logic state to all other entries.

ERAT 44 performs a segment look-a-side buffer invalidate entry operation when instruction fetch unit 18 decodes an SLBIE instruction. In an SLBIE operation, ERAT 44 invalidates all mappings associated with a specified segment or ESID. There may be any number of mappings associated with a particular ESID in ERAT 44 at a given moment. ERAT 44 identifies all mappings corresponding to the specified segment by applying the specified ESID to the each entry's ESID CAM cells. ERAT 44 ignores the EPI matchline signals. If the input ESID and the contents of the ESID CAM of a particular entry match, then the entry's first matchline will remain in a precharged state. The particular entry's wordline driver will then assert the entry's wordline, coupling the corresponding V-BIT to a voltage level corresponding to an invalid entry. This voltage level will be written to the invalid entry's V-BIT.

ERAT 44 performs a table look-a-side buffer invalidate entry operation when instruction fetch unit 18 decodes a TLBIE instruction. In a TLBIE operation, ERAT 44 invalidates all mappings associated with a specified page or EPI. There may be any number of mappings associated with a particular EPI in ERAT 44 at a given moment. ERAT 44 identifies all mappings corresponding to the specified page by applying the specified EPI to the each entries EPI CAM cells. ERAT 44 ignores the ESID matchline signals. If the input EPI and the contents of the EPI CAM of a particular entry match, then the entry's second matchline will remain in a precharged state. The particular entry's wordline driver will then assert the entry's wordline, coupling the corresponding V-BIT to a voltage level corresponding to an invalid entry. This voltage level will be written to the invalid entry's V-BIT.

ERAT 44 performs a segment look-a-side buffer invalidate entry operation when instruction fetch unit 18 decodes an SLBIA instruction. In a SLBIA operation, ERAT 44 invalidates all mappings in ERAT 44. ERAT 44 ignores both the ESID and EPI matchline signals. In an SLBIA operation, each wordline driver asserts its wordline, coupling the corresponding V-BIT to a voltage level corresponding to an invalid entry.

3. SECONDARY ADDRESS TRANSLATION UNIT

A. Overview

Figure 9:
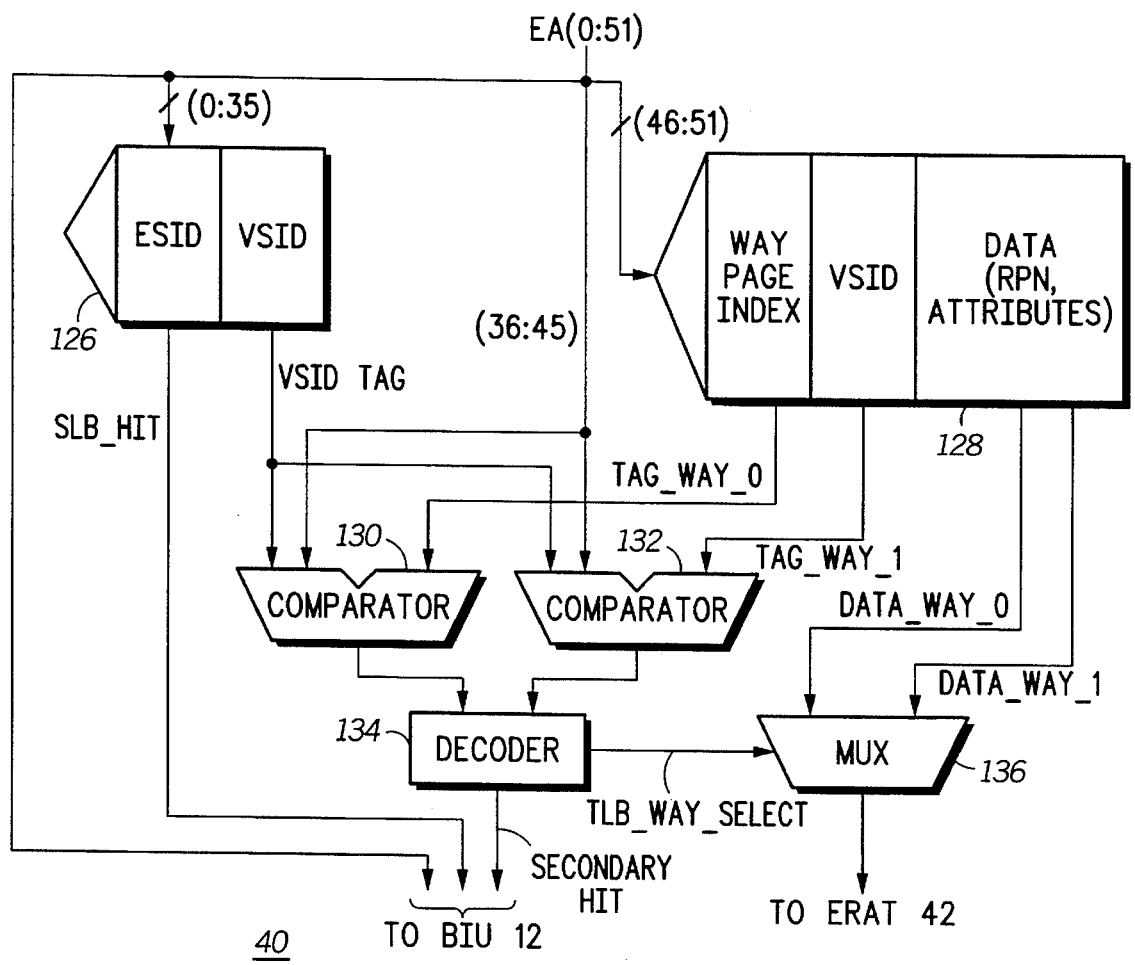
FIG. 9 depicts a block diagram of the secondary address translation unit illustrated in FIG. 1.

FIG. 9 depicts a block diagram of secondary address translation unit 40 illustrated in FIG. 1. Secondary translation unit 40 provides a particular effective-to-real address translation to ERAT 44 when ERAT 44 determines that it does not contain the particular translation: the refill after miss operation described above in connection with FIG. 8. Secondary address translation unit 40 translates the received effective address into a real address according to the PowerPC Architecture sixty-four bit paging/segmentation scheme. In this paging/segmentation scheme, each effective address is first translated into an intermediate or virtual address and then into a real address. Although it should be noted that this virtual address is not used as an addressing index. In the first step of this paging/segmentation scheme, the thirty-six MSBs of the effective address (the ESID) are translated into a fifty-two bit virtual segment identifier (a "VSID"). The virtual address may be conceptually thought of as the concatenation of the VSID and the twenty-eight LSBs of the effective address. The virtual address is eighty bits wide. In the second step of this paging segmentation scheme, the sixty-eight MSBs of the virtual address are translated into a fifty-two bit real page number ("RPN"). The real address is the concatenation of the RPN and the twelve LSBs of the effective address.

A segment look-a-side buffer ("SLB") 126 receives the effective address's ESID, generates a control signal segment look-a-side buffer hit ("SLB HIT"), and outputs a virtual segment identifier ("VSID TAG") associated with the input ESID. SLB 126 is a fully associative twenty entry CAM/SRAM structure. Each entry contains thirty-six CAM cells connected to a matchline and fifty-two SRAM cells. The thirty-six CAM cells store a thirty-six bit ESID. The fifty-two SRAM cells store a fifty-two bit VSID. Each ESID CAM cell is similar to CAM cell 52 depicted in FIG. 4. Each entry in ERAT 44 maps one effective page to a real page. SLB 126 is described below in connection with FIGS. 10 and 11.

A page table look-a-side buffer ("TLB") 128 receives the six LSBs of the effective address's EPI and outputs two tag-data sets. Each output tag (TAG WAY0, TAG WAY1) contains the ten MSBs of an EPI (a way page index) and a virtual segment identifier associated with a particular virtual-to-real address translation. Each data output (DATA WAY0, DATA WAY1) contains the RPN associated with a particular virtual-to-real address translation and various bits describing attributes about the resulting page such as access privileges, cacheability, etc. TLB 128 is a one hundred and twenty-eight entry two-way set associative SRAM cache.

A comparator 130 compares the logical equivalency of (1) the concatenation of VSID TAG with the ten MSBs of the input effective address's EPI and (2) TAG WAY0. A comparator 132 compares the logical equivalency of (1) the concatenation of VSID TAG with the ten MSBs of the input effective address's EPI and (2) TAG WAY1. A decoder 134 receives the output of comparators 130 and 132 and generates the control signal SECONDARY HIT. An output of decoder 134 also selects which of two inputs a multiplexer 136 outputs to ERAT 44. Secondary translator unit 40 forwards the effective address and the control signals SLB HIT and SECONDARY HIT to BIU 12.

In the depicted embodiment, secondary translation unit 40 translates the input effective address into a virtual address in parallel with translating the virtual address into a real address. This parallel strategy is faster than a strict serial effective-to-virtual-to-real methodology. However, secondary translation unit 40 must make a guess at the virtual address when it begins the virtual-to-real translation step.

In the effective-to-virtual step, SLB 126 compares the input ESID to each stored ESID. If the input ESID matches a stored ESID, then a SLB hit occurs. In this case, SLB 126 outputs the VSID corresponding to the matching ESID. SLB 126 also asserts the control signal SLB HIT. If the input ESID does not match any stored ESID, then a SLB miss occurs. In this case, SLB 126 de-asserts the control signal SLB HIT.

In the virtual-to-real step, TLB 128 uses the six LSBs of the EPI to index two entries. The two-way set associative nature of TLB 128 forces a particular VSID into either one of two entries in TLB 128. The two entries are indexed by the six LSBs of the VSID's EPI. These two entries are the TLB's "guess." Comparators 130 and 132 determine if one or none of the VSID guesses was correct. As described above, comparators 130 and 132 compare the logical equivalency of (1) the concatenation of VSID TAG with the ten MSBs of the input effective address's EPI and (2) TAG WAY0 or TAG WAY1, respectively. If one of the guesses was correct, then a TLB hit occurs. In this case, decoder 134 causes multiplexer 136 to output the RPN corresponding to the correctly guessed VSID to ERAT 44. Decoder 134 will also assert the control signal SECONDARY HIT. If neither of the guesses was correct, then a TLB miss occurs. In this case, decoder 134 will de-assert the control signal SECONDARY HIT.

BIU 12 accesses main memory for translation mappings if either an SLB miss or a TLB miss occurs, "a hardware tablewalk." The software operating system running on data processor 10 establishes segment tables and page tables in main memory where all permissible effective-to-virtual and virtual-to-real mappings, respectively, are stored. In the case of an SLB miss, BIU 12 reads the required effective-to-virtual translation at an address in main memory generated by the concatenation of the contents a first special purpose register (not shown) with a mathematical function (a "hash") of the ESID. Similarly, in the case of a TLB miss, BIU 12 reads the required virtual-to-real translation at an address in main memory generated by the concatenation of the contents a second special purpose register (not shown) with a hash of the EPI. These translation mappings are then stored in SLB 126 and TLB 128, as appropriate, for later use.

B. Segment Look-A-Side Buffer

Figure 10:
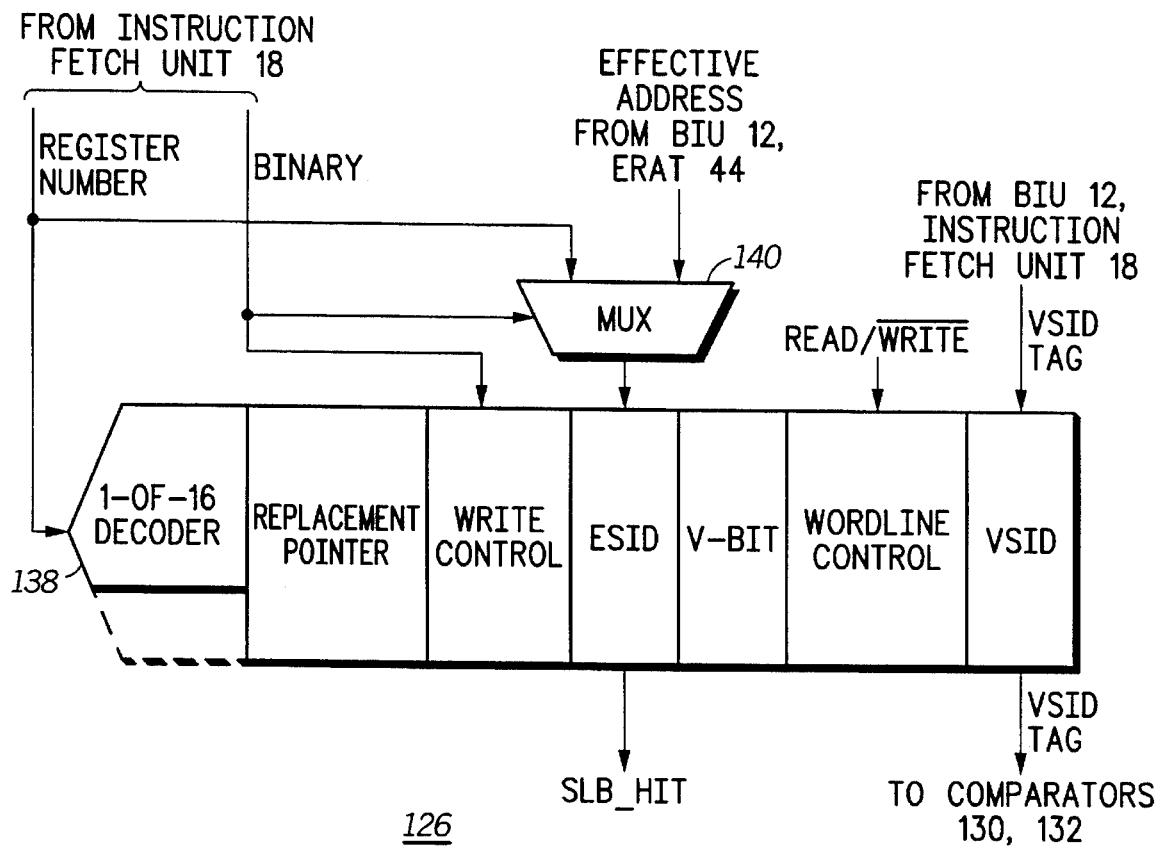
FIG. 10 depicts a block diagram of the segment look-a-side buffer illustrated in FIG. 9.

FIG. 10 depicts a block diagram of SLB 126 illustrated in FIG. 9. SLB 126 is compatible with the PowerPC thirty-two bit and sixty-four bit address translation models. In particular, the PowerPC thirty-two bit address translation model requires that sixteen entries in SLB 126 be addressable for reading and writing with a unique binary input. SLB 126 acts like a register file in this model. Conversely, the PowerPC sixty-four bit address translation model only requires that an individual entry in SLB 126 be accessible if the contents of its ESID matches an input ESID or a if a replacement algorithm indicates that it should be replaced. SLB 126 acts like a table in this model. The described SLB performs both functions without increasing the critical read speed path.

SLB 126 is a twenty entry CAM/SRAM structure. Each entry contains a REPLACEMENT POINTER bit cell storing an entry replacement pointer, a write control circuit, thirty-six CAM cells connected to a matchline storing an ESID, a V-BIT cell storing a valid entry bit, a wordline control circuit, and fifty-two SRAM bit cells storing a VSID corresponding to the entry's ESID. The REPLACEMENT POINTER field is implemented as a ring counter. One entry in the counter is initially designated and a voltage level corresponding to a first logic state is written to that entry's REPLACEMENT POINTER bit cell. A voltage level corresponding to a second logic state is written to all other REPLACEMENT POINTER bit cells. The replacement pointer is advanced to the next sequential entry when a VSID is written to the previous entry. Otherwise, the REPLACEMENT POINTER continues to designate the previous entry. The write control and wordline control circuits are described below in connection with FIGS. 11 and 12.

The PowerPC thirty-two bit translation model requires that the first sixteen entries may be written to or read from using a move-to or move-from instruction. Therefore, a one-of-sixteen decoder 138 is connected to the first sixteen entries of SLB 126. (The PowerPC Architecture only defines sixteen registers in the thirty-two bit operating model.) Decoder 138 receives a binary address and a control signal BINARY from instruction fetch unit 18 when data processor 10 executes a move-to or move-from instruction. Decoder 138 then asserts the one of sixteen DECODE control signals connected to the entry specified by the instruction. Also, a multiplexer 140 couples either a register number or an effective address to the reference and reference-bar input lines and to the bit line and bit line-bar input lines of the ESID CAM cells.

Figure 11:
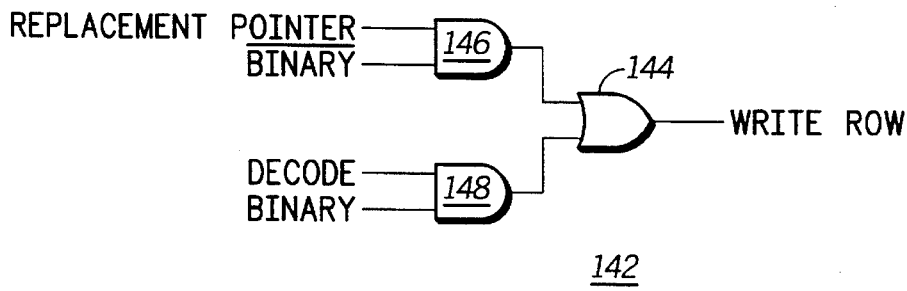
FIG. 11 depicts a logic diagram of a first portion of the segment look-a-side buffer illustrated in FIG. 10.

FIG. 11 depicts a logic diagram of a first portion of SLB 126 illustrated in FIG. 10, a write control circuit 142. Each entry in SLB 126 contains one write control circuit 142. An output of an OR gate 144 generates a control signal WRITE ROW. The use of control signal WRITE ROW is described below in connection with FIG. 12. A first input of OR gate 144 is connected to an output of an AND gate 146. A second input of OR gate 144 is connected to an output of an AND gate 148. A first input of AND gate 146 is connected to the entry's replacement pointer bit cell. A second input of AND gate 146 receives the logical complement of the control signal BINARY. A first input of AND gate 148 receives the control signal DECODE. Decoder 138 asserts the Nth one of sixteen DECODE control signals if a move-to or a move-from instruction specifies the Nth entry in SLB 126 as the destination or source register, respectively, of the instruction. The final four entries in SLB 126 receive a voltage level corresponding to a low logic state instead of the control signal DECODE. A second input of AND gate 148 receives the control signal BINARY.

Figure 12:
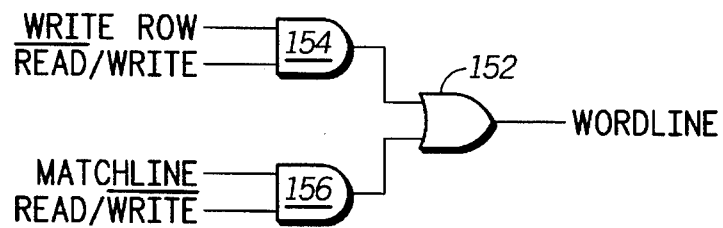
FIG. 12 depicts a logic diagram of a second portion of the segment look-a-side buffer illustrated in FIG. 11.

FIG. 12 depicts a logic diagram of a second portion of SLB 126 illustrated in FIG. 10, a wordline control circuit 150. Each entry in SLB 126 contains one wordline control circuit 150. An output of an OR gate 152 generates a control signal WORDLINE. The control signal wordline couples each bit cell in a particular entry to the bit lines. The contents of the various bit cells may then be written to or read from depending upon the operation. A first input of OR gate 152 is connected to an output of an AND gate 154. A second input of OR gate 152 is connected to an output of an AND gate 156. A first input of AND gate 154 receives the entry's WRITE ROW control signal. A second input of AND gate 154 receives the logical complement of the control signal READ/WRITE. A first input of AND gate 156 receives the control signal MATCHLINE. Each entry's ESID CAM cells control the voltage on MATCHLINE as described above in connection with FIG. 4. A second input of AND gate 156 receives the signal READ/WRITE.

Returning to FIG. 10, SLB 126 performs four functions reflecting its dual buffer-register file nature: SLB write, SLB read, segment register write, and segment register read. In the PowerPC Architecture, a segment register write to a particular entry in SLB 126 must precede a segment register read from the particular entry.

In an SLB write operation, BIU 12 supplies an effective-to-virtual page translation to SLB 126 after an SLB miss. Instruction fetch unit 18 de-asserts the control signal BINARY and BIU 12 de-asserts the control signal READ/WRITE. BIU 12 also supplies the translation's ESID and VSID to multiplexer 140 and to the VSID bit lines, respectively. Only one write control circuit 142 will assert its control signal WRITE ROW. And, only one wordline control circuit 150 will connect its bit cells to the input ESID and VSID. The input ESID and VSID will be written to this one entry. The one entry is the entry whose REPLACEMENT POINTER bit cell stores the first logic state. The REPLACEMENT POINTER is then advanced to the next sequential entry.

In an SLB read operation, ERAT 44 forwards an effective address to secondary translation unit 40 that ERAT 44 was not able to translate. Instruction fetch unit 18 de-asserts the control signal BINARY and ERAT 44 asserts the control signal READ/WRITE. ERAT 44 also supplies the translation's ESID to multiplexer 140 for comparison against all stored ESIDs. Only one write control circuit will assert its control signal WRITE ROW. And, only one wordline control circuit will connect its VSID bit cells to the output bit lines. SLB 126 forwards the one entry's VSID TAG to comparators 130 and 132 for comparison as described above in connection with FIG. 9. The one entry is the entry whose ESID matches the input ESID. This one entry's matchline will remain in a pre-charged state.

In an segment register write operation, a program instruction specifies one of the first sixteen entries in SLB 126 as the destination of an instruction operand. Instruction fetch unit 18 asserts the control signal BINARY, de-asserts the control signal READ/WRITE, and specifies the particular one of the sixteen entries by the control signal REGISTER NUMBER. Instruction fetch unit 18 also forwards the register number and the instruction operand to multiplexer 140 and to the VSID bit lines, respectively. Only one write control circuit 142 will assert its control signal WRITE ROW. And, only one wordline control circuit 150 will connect its bit cells to the input register number and instruction operand. The input register number and instruction operand will be written to this one entry. The one entry is the entry selected by one-of-sixteen decoder 138. For instance, the instruction move-to-segment register five (decimal) will write "0101" (decimal five) and a specified operand to the fifth entry's ESID and VSID, respectively. The REPLACEMENT POINTER is then advanced to the entry following the selected entry, regardless of the previous location of the replacement pointer. This procedure delays replacing the contents of the selected entry as long as possible.

In an segment register read operation, a program instruction specifies the VSID of one of the first sixteen entries in SLB 126 as the source of an instruction operand. Instruction fetch unit 18 asserts the control signal BINARY and asserts the control signal READ/WRITE. Instruction fetch unit 18 also forwards the register number to multiplexer 140. Only one wordline control circuit 150 will connect its VSID bit cells to the output bit lines. The instruction operand will be sourced from this one entry. The one entry is the entry whose ESID matches the input register number. This one entry's matchline will remain in a pre-charged state. Continuing with the previous example, the fifth entry's wordline control circuit 150 will connect its VSID bit cells to the output bit lines because the contents of its ESID, "0101," (decimal five) matches the input register number, five (decimal). The segment read operation, as described herein, does not impact the performance of the SLB read operation. The SLB read operation, generally, is the slower of the two read operations. SLB 126 thereby limits additional delay to the critical SLB read speed path.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. An address translator for translating a first address into a second address comprising:

a switching means, receiving the first address and a register number, the switching means outputting either the first address or the register number responsive to a first control signal, an output of the switching means hereafter referred to as a "match tag,";

a selecting circuitry for asserting one of a plurality of second control signals responsive to the register number;

a plurality of entries, each one of the plurality of entries comprising:

a tag means coupled to the switching means, the tag means storing a translation tag, the tag means asserting a third control signal if the translation tag is logically equivalent to the match tag;

a storage means storing a second address; and a wordline control circuit coupled to the selecting circuitry, to the tag means, and to the storage means, the wordline control circuit outputting the second address responsive to the tag means asserting the third control signal.

2. The address translator of claim 1 wherein the wordline control circuit stores a received register number and a received second address in the tag means and in the storage means, respectively, responsive to the assertion of the first control signal.

3. The address translator of claim 2 wherein the plurality of entries further comprises a pointer means, the pointer means selecting one of the plurality of entries for replacement, and wherein the wordline control circuit stores the match tag and a received second address in the tag means and in the storage means, respectively, responsive to the replacement pointer.

4. The address translator of claim 1 wherein the plurality of entries further comprises a pointer means, the pointer means selecting one of the plurality of entries for replacement, and wherein the wordline control circuit stores the match tag and a received second address in the tag means and in the storage means, respectively, responsive to the replacement pointer.

5. An address translator for translating a first address into a second address comprising:

a multiplexer, receiving the first address and a register number, the multiplexer outputting either the first address or the register number responsive to a first control signal, an output of the multiplexer hereafter referred to as a "match tag,";

a one-of-N decoder for asserting one of a plurality of second control signals responsive to the register number;

a plurality of entries, each one of the plurality of entries comprising:

a plurality of content addressable memory bit cells storing a translation tag, the plurality of content addressable memory bit cells asserting a matchline signal if the translation tag is logically equivalent to the match tag;

a plurality of memory bit cells storing a translated address; and a wordline control circuit coupled to the one-of-N decoder, to the plurality of content addressable memory bit cells, and to the plurality of memory bit cells, the wordline control circuit outputting the translated address responsive to the plurality of content addressable memory bit cells asserting the matchline signal.

6. The address translator of claim 5 wherein the wordline control circuit stores a received register number and a received translated address in the plurality of content addressable memory bit cells and in the plurality of memory bit cells, respectively, responsive to the assertion of the first control signal.

7. The address translator of claim 6 wherein the plurality of entries further comprises a pointer means, the pointer means selecting one of the plurality of entries for replacement, and wherein the wordline control circuit stores the match tag and a received translated address in the plurality of content addressable memory bit cells and in the plurality of memory bit cells, respectively, responsive to the replacement pointer.

8. The address translator of claim 5 wherein the plurality of entries further comprises a pointer means, the pointer means selecting one of the plurality of entries for replacement, and wherein the wordline control circuit stores the match tag and a received translated address in the plurality of content addressable memory bit cells and in the plurality of memory bit cells, respectively, responsive to the replacement pointer.

9. A method of translating a received first address into a translated address, the method comprising the steps of:

during a first time, first receiving a register number in a one of-N decoder and in a plurality of content addressable memory bit cells, each one of a plurality of entries comprising the plurality of content addressable memory bit cells and a plurality of memory bit cells, the plurality of content addressable memory bit cells storing a translation tag, the plurality of memory bit cells storing a translated address, each one of the plurality of entries coupled to the one-of-N decoder;

second receiving a translated address in the plurality of bit cells, first writing the register number in the plurality of content addressable memory bit cells of a decoded one of the plurality of entries, the decoded one responsive to the register number;

second writing the translated address in the plurality of memory bit cells of the decoded one of the plurality of entries;

during a second time, third receiving a first address in the plurality of content addressable memory bit cells in each of the plurality of entries;

first comparing the first address to each translation tag; and first outputting the translated address of a matched one of the plurality of entries, the matched one of the plurality of entries responsive to the step of first comparing.

10. The method of claim 9 further comprising the steps of:

during a third time, fourth receiving the register number in the plurality of content addressable memory bit cells of each of the plurality of entries;

second comparing the register number to each translation tag; and second outputting the translated address of a matched one of the plurality of entries, the matched one of the plurality of entries responsive to the step of second comparing.

* * * * *